(12) United States Patent
Kinnunen-Raudaskoski et al.

(10) Patent No.: US 11,885,072 B2
(45) Date of Patent: Jan. 30, 2024

(54) WATER-DISPERSIBLE COMPOSITE STRUCTURE AND METHOD OF PRODUCING THE SAME

(71) Applicant: Paptic Oy, Espoo (FI)

(72) Inventors: Karita Kinnunen-Raudaskoski, Espoo (FI); Martin Häggblom, Espoo (FI)

(73) Assignee: Paptic Oy, Espoo (FI)

( * ) Notice: Subject to any disclaimer, the term of this patent is extended or adjusted under 35 U.S.C. 154(b) by 0 days.

(21) Appl. No.: 17/987,921

(22) Filed: Nov. 16, 2022

(65) Prior Publication Data

US 2023/0074973 A1 Mar. 9, 2023

Related U.S. Application Data

(62) Division of application No. 17/259,967, filed as application No. PCT/FI2019/050546 on Jul. 15, 2019, now Pat. No. 11,512,434.

(30) Foreign Application Priority Data

Jul. 13, 2018 (FI) ..................... 20180084

(51) Int. Cl.
| | |
|---|---|
| *D21H 11/04* | (2006.01) |
| *D21H 27/00* | (2006.01) |
| *D21H 11/12* | (2006.01) |
| *D21H 11/14* | (2006.01) |
| *D21H 13/14* | (2006.01) |
| *D21H 13/24* | (2006.01) |
| *D21H 13/28* | (2006.01) |
| *D21H 17/35* | (2006.01) |
| *D21H 17/36* | (2006.01) |
| *D21H 17/37* | (2006.01) |
| *D21H 17/57* | (2006.01) |
| *D21H 21/16* | (2006.01) |
| *D21H 23/28* | (2006.01) |
| *D21H 23/34* | (2006.01) |
| *D21H 23/56* | (2006.01) |

(52) U.S. Cl.
CPC .......... *D21H 27/002* (2013.01); *D21H 11/04* (2013.01); *D21H 11/12* (2013.01); *D21H 11/14* (2013.01); *D21H 13/14* (2013.01); *D21H 13/24* (2013.01); *D21H 13/28* (2013.01); *D21H 17/35* (2013.01); *D21H 17/36* (2013.01); *D21H 17/37* (2013.01); *D21H 17/57* (2013.01); *D21H 21/16* (2013.01); *D21H 23/28* (2013.01); *D21H 23/34* (2013.01); *D21H 23/56* (2013.01)

(58) Field of Classification Search
CPC .......... D04H 1/64; D04H 1/26; D04H 1/578; D04H 1/68; D04H 1/32; D21H 17/17; D21H 23/56

USPC .......................................................... 162/146
See application file for complete search history.

(56) References Cited

U.S. PATENT DOCUMENTS

| | | | |
|---|---|---|---|
| 3,563,241 A | 2/1971 | Evans et al. | |
| 4,597,831 A * | 7/1986 | Anderson .............. | D21H 21/56 162/158 |
| 5,223,095 A | 6/1993 | Kinsley | |
| 5,346,541 A | 9/1994 | Goldman et al. | |
| 5,629,081 A | 5/1997 | Richards et al. | |
| 5,830,952 A | 11/1998 | Pedersen et al. | |
| 6,287,419 B1 | 9/2001 | Takeuchi et al. | |
| 2002/0146552 A1 | 10/2002 | Mumick et al. | |
| 2003/0045191 A1 | 3/2003 | Goldstein et al. | |
| 2004/0063888 A1 | 4/2004 | Bunyard et al. | |
| 2004/0260034 A1 | 12/2004 | Haile et al. | |
| 2008/0076314 A1 | 3/2008 | Blanz et al. | |
| 2014/0318726 A1 | 10/2014 | Collins et al. | |
| 2017/0073863 A1 | 3/2017 | Collins et al. | |
| 2017/0260694 A1 | 9/2017 | Torniainen et al. | |

FOREIGN PATENT DOCUMENTS

| | | | |
|---|---|---|---|
| CN | 1942627 A | 4/2007 | |
| CN | 102414369 A | 4/2012 | |
| CN | 102753611 A | 10/2012 | |
| CN | 102782215 A | 11/2012 | |
| CN | 103069076 A | 4/2013 | |
| CN | 10439878 A | 2/2015 | |
| CN | 107251458 A | 10/2017 | |
| CN | 107407053 A | 11/2017 | |
| EP | 0082653 A1 | 6/1983 | |
| EP | 0 195 458 * | 9/1986 | .............. D21D 3/00 |
| EP | 1285985 A1 | 2/2003 | |
| EP | 3224411 A1 | 10/2017 | |
| JP | H05222344 A | 8/1993 | |
| JP | 2000273747 A | 10/2000 | |
| JP | 2006002277 A | 1/2006 | |
| KR | 200385260 Y1 | 5/2005 | |
| WO | WO2005041634 A1 | 5/2005 | |
| WO | WO2016083667 A1 | 6/2016 | |
| WO | WO2017162927 A1 | 9/2017 | |
| WO | WO2017203101 A1 | 11/2017 | |

* cited by examiner

*Primary Examiner* — Mark Halpern
(74) *Attorney, Agent, or Firm* — Laine IP Oy

(57) ABSTRACT

A water-dispersible composite structure, which comprises one or more layers, and a method of producing the same. At least a part of the layers is formed by a fibrous web or sheet containing 50-90 parts by weight of wood fibers and 10-90 parts by weight of annual or perennial plant fibers and/or 10-50 parts by weight of synthetic short-cut fibers, and 0.1-20% by weight of a binder, calculated from the weight of the fibers, and at least a part of the binder being a water-soluble polymer and another part a water dispersible binder, and the fibrous sheet or web being produced by wet forming. By means of the invention, the fibers of the composite structure can be recovered and recycled by equipment conventionally used in the paper and paperboard industry.

19 Claims, 1 Drawing Sheet

WATER-DISPERSIBLE COMPOSITE STRUCTURE AND METHOD OF PRODUCING THE SAME

CROSS-REFERENCE TO RELATED APPLICATIONS

The present application is a divisional application of U.S. application Ser. No. 17/259,967, filed Jan. 13, 2021, which is a National Stage application of PCT/FI2019/050546, filed Jul. 15, 2019, which claimed priority to Finnish Patent Application No. 20180084, filed Jul. 13, 2018. The entirety of each application is incorporated by reference herein.

FIELD OF THE INVENTION

The present invention relates to fibrous structures, such as sheet- or web-formed layered materials manufactured from fibrous feedstocks. Such materials can be dispersed in an aqueous medium separately to yield at least a part of the fibers of the raw-material which can be recovered. More specifically, the present invention concerns structures comprising fibers of natural and synthetic origin which form composite materials which can be dispersed in aqueous media. The invention also concerns methods of producing such materials and uses thereof.

BACKGROUND

Dispersible nonwoven fabrics are known in the art. They find uses as dispersible and flushable fabrics for hygienic applications.

U.S. Pat. No. 5,346,541 teaches water dispersible formulations and materials and methods for influencing their water dispersibility. The water dispersible formulations comprise 1 to 90% by weight of at least one water soluble cellulose ether binder. In addition, the formulations contain at least about 10% to about 99% by weight of long cellulose fibers ranging in length from greater than about 300 microns to about 2 millimeters or more. It is stated in the document that the inclusion of significant quantities of long cellulose fibers increases the water dispersibility of water soluble cellulose ether binders. Gas releasing agents can be included to increase the rate of water dispersibility of the formulations. Use of the materials in the healthcare and food industries is suggested.

U.S. Pat. No. 3,563,241 discloses absorbent textile-like structures for single use purposes, which materials exhibit strength and durability to allow for proper use but which are still capable of being disposed of in sewage systems after use. The structure comprises water-sensitive fibers having ionizable groups; materials can be selected from, for example, cyanoethyl cellulose or hydroxyethyl cellulose.

Other flushable wet wipes are taught in U.S. Pat. No. 5,629,081 and EP 1,285,985.

US 2014/0318726 discloses a fabric comprising pulp and solvent spun fibers which can be used in rapidly dispersible wet wipes. The solvent spun fibers comprise fibrillated cellulosic for example of the Tencel kind. In the examples of the patent application, a blend of wood pulp with Tencel short cut fibers was used to make wetlaid fabrics. The fibers are refined, 1% CMC is added as a dispersing aid, and an epichlorhydrin based wet strength resin is added to increase the wet strength. The slurry thus formed is then wet-laid, e.g. on a papermaking machine, to form a sheet. The sheet then passes through a hydroentanglement process either on-line or as a separate off-line process to form a fabric.

The obtained wipes are said to be flushable through a standard toilet system and capable of disintegrating into dispersible fragments that biodegrade after disposal.

Although the disclosed materials are dispersible in water, they are designed for use as disintegrating and discardable materials (single-use materials). For this reason, the known, dispersible materials are still lacking in terms of strength and structural integrity, when compared with corresponding non-disintegrating material. As a result, they find their primary application in products which allow for full disintegration already in waste water and sewage systems. The materials they contain are therefore wasted after use and no recycling is possible.

The use of hydroentanglement in the art will impair repulping of the material for recovery and recycling of the constituent materials.

There is a need for dispersible structures materials which have good mechanical properties while still being capable, by conventional recycling processes employed in the paper and paperboard industry, of being dispersed in aqueous phase to yield fractions of the constituent fibers and of being recycled.

SUMMARY OF THE INVENTION

It is an aim of the present invention to provide novel water-dispersible compositions and structures comprising at least one layer, for example a plurality of overlapping layers, formed by fibrous webs or sheets.

It is another aim to provide a method of manufacturing such composition.

Still a third aim is to provide uses of the compositions.

The present invention is based on the concept of manufacturing by wet forming a fibrous layer which contains wood fibers, natural and/or synthetic non-wood fibers and a binder.

Surprisingly, it has been found that a water-dispersible sheet or web having mechanical properties can be produced by providing a fibrous composition which comprises at least 50% of wood fibers in mixture with natural and/or synthetic fibers, and by binding the fibers together using a binder which is compatible with wet forming and which comprises a water-soluble polymer and a water-dispersible polymer.

The present materials can be manufactured by wet forming by the steps of conveying an aqueous fibrous slush to a support;
draining liquid through the support to form a fibrous layer; and
applying a binder on the fibrous layer for at least partially binding the fibers together, the binder comprising an aqueous solution of a water-soluble polymer and further containing a water-dispersible polymer.

The compositions and the method can be used for providing non-woven products such as non-woven webs and non-woven sheets.

More specifically, the present invention is mainly characterized by what is stated in the charactering parts of the independent claims.

Considerable advantages are obtained by the present invention. Thus, the present materials have good mechanical properties which allows for their use in typical paper, paperboard and nonwoven applications. In particular, the present invention can be used for preparing non-woven products selected from the group of webs and sheets.

In addition, the materials can be dispersed in a conventional pulper, of the kind used in the paper or paperboard industry, to separate at least the wood fibers from the water-dispersible material. Due to the structure of the materials, the wood fibers can be at least partially recovered and, if desired, recycled for use in fibrous materials and other materials.

Wet-forming can be carried out industrially on, e.g., a non-woven or paper machine.

Adhesive bonding is attained without the need for mechanical bonding like hydroentanglement or spun-lacing.

Embodiments of the present technology will be discussed in more detail with reference to the attached illustrations.

EMBODIMENTS

Figure 1:
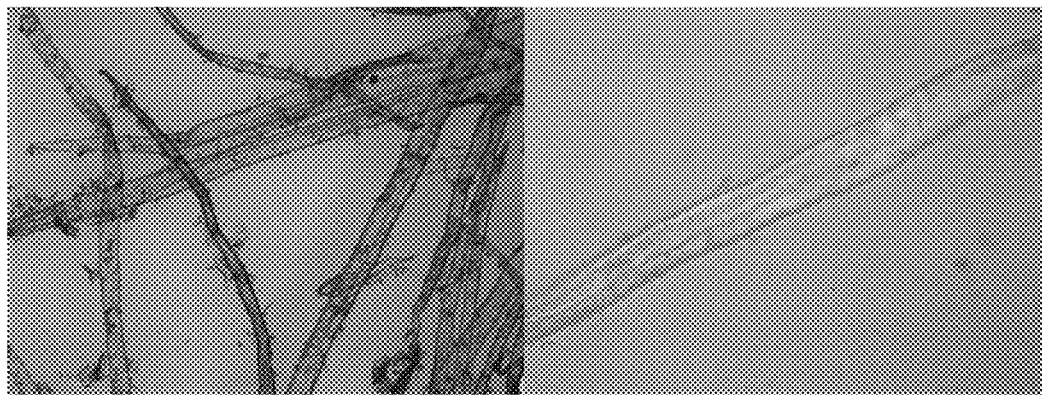
FIG. 1 is a micrograph showing on the left-hand side the accept of a reference material, and on the right-hand side the single fiber of such a material.

As discussed above, the present technology provides composite structures in the form of water dispersible fibrous layers which contain natural fibers, such as wood fibers in combination with natural or synthetic fibers.

In an embodiment, in the water-dispersible composite structure the fibrous web or sheet comprises a network of fibers held together primarily by hydrogen bonds and adhesive bonding.

In the present context, the layers are called "composite structures" in the respect that they contain both natural and synthetic fibers.

"Water dispersible", when used in connection of the present materials, means that the fibrous matrices can be broken up and the constituent fibrous materials separated from the materials and from each other. Thus, at least a portion, e.g. at least 5%, in particular at least 10%, suitable at least 20% by weight of the wood fibers or other natural fibers can be recovered and optionally recycled.

In one aspect, water dispersability relates to the properties of the material of being capable of industrial repulping at conditions used in recycling of paper, cardboard, and other fiber based products. For example, common conditions for low consistency (LC) pulping are a consistency of 2 to 7 wt-% and a temperature of 30 to 60° C. Common conditions for (HC) pulping are a consistency of 10 to 35 wt-% and a temperature of 30 to 60° C. The pulping time depends on the layout of the industrial pulper, such as dimensions of the equipment and the rotor used for slushing. Typically, the pulping process is performed until an appropriate amount of fibers are deliberated from the initial material structure. The pulping process may include chemicals such as NaOH, $H_2O_2$, chelant, sodium silicate, and surfactants.

According to one embodiment, the water-dispersible composite structure comprises natural fibers in the form of "wood fibers". In one embodiment such wood fibers are selected from bleached and non-bleached, refined and unrefined, in particular unrefined fibers, selected from the group of chemical pulp fibers, recycled fibers, mechanical pulp fibers and semimechanical pulp fibers and combinations thereof.

The wood material can be birch, beech, aspen, such as European aspen, alder, *eucalyptus*, maple, acacia, mixed tropical hardwood, pine, such as loblolly pine, fir, hemlock, larch, spruce such as Black spruce or Norway spruce, or a mixture thereof.

The second fibrous component(s) of the present composite structures are non-wood fibers. Such fibers can be natural fibers, e.g. annual plant fibers, or synthetic fibers or combinations thereof. Synthetic fibers can also be characterized as "man-made" in contrast to the wood fibers and the natural non-wood fibers which in the present context are considered non-synthetic fibers.

Thus, in one embodiment, the non-wood fibers are selected from the group consisting of fibers obtained from vegetable materials other than wood (also referred to as natural non-wood (or "non-woody" materials) and man-made fibers, such as synthetic fibers, in particular polymer fibers.

The non-wood fibers can be selected for example from the groups of
  annual or perennial plant fibers, for example hemp, flax, kenaf, bagasse, cotton, straw;
  thermoplastic fibers, for example polylactides (PLA), glycolic acid polymers (PGA), polyhydroxyalkanoates (PHA), polyolefins (PO), polyethyleneterephthalates (PET), polyester (PES), polyvinyl alcohols (PVA) fibers;
  bicomponent fibers comprising thermoplastic polymers;
  mineral fibers, glass fibers;
  regenerated cellulose fibers, such as viscose fibers, lyocell fibers, and rayon fibers; and combinations of fibers selected from two or more of the aforementioned groups.

In one embodiment, the non-wood fibers, in particular the synthetic fibers, are "short-cut" fibers. In the present context, "short-cut fibers" are fibers having a length of 5 to 25 mm, in particular 6 to 18 mm. In one embodiment, they can have a thickness of 0.5 dtex to 20 dtex, in particular 1 to 15 dtex, for example 1.5 to 10 dtex.

The annual or perennial plant fibers can be present as short-cut fibers (as defined above) or as fibers obtained by defibration, including mechanical, semimechanical or chemical defibration, of the corresponding plant materials.

In one embodiment, the fibrous layer is formed by a fibrous web or sheet containing 50-90 parts by weight of wood fibers together with 0 to 90, for example 10 to 90 parts by weight of annual or perennial plant fibers, and 0 to 50, for example 10 to 50 parts by weight of synthetic short-cut fibers or combinations thereof. The total amount of non-wood natural fibers and synthetic fibers is typically 10 to 50 parts by weight.

In one embodiment, 50 to 99% by weight, in particular 60 to 90% by weight, of the fibers of the fibrous layer are constituted by cellulosic or lignocellulosic fibers or mixtures thereof, and 1-50% by weight, in particular 10-40% by weight, of man-made fibers.

In one embodiment, 50 to 99% by weight, in particular 60 to 90% by weight, of the fibers of the fibrous layer are constituted by cellulosic or lignocellulosic fibers or mixtures thereof, and 1-50% by weight, in particular 10-40% by weight, of non-wood natural fibers, such as fibers of annual or perennial plants, or of such fibers in combination with man-made fibers.

In one embodiment, the man-made fibers are selected from the group of regenerated cellulosic fibers, synthetic fibers, synthetic thermoplastic fibers and mixtures thereof.

The regenerated cellulosic fibers can be selected from the group of viscose fibers, lyocell fibers, rayon fibers and mixtures thereof. The thermoplastic fibers are selected from the group of polyolefin fibers, polyester fibers and biopolymer fibers and mixtures thereof.

In one embodiment, annual and other non-wood natural (typically plant) fibers are selected from the group of straws of grain crops, wheat straw, reed canary grass, reeds, flax, hemp, kenaf, jute, ramie, seed, sisal, abaca, coir, bamboo, bagasse, cotton kapok, milkweed, pineapple, cotton, rice, reed, esparto grass, *Phalaris arundinacea*, and combinations thereof. Further non-wood fibers are selected from the group of seed hair fibers, leaf fibers, and bast fibers.

In one embodiment, the present composite structures further comprise about 0.1 to 20% by weight calculated based on the dry matter of the binder and the dry matter of the fibrous part of the fibrous layer.

In the present context, the term "binder" stands for a substance capable of bonding fibers together such as to contribute to the forming of a network of fibers. The term "binder" denotes both single substances as well as mixtures of substances.

In one embodiment, the present invention comprises a combination of a water-soluble polymer and a water-dispersible polymer. The water-soluble polymer is typically a hydrophilic polymer, whereas the water-dispersible polymer is typically a hydrophobic polymer.

In one embodiment, the binder is selected from the group consisting of polyvinyl alcohols, polyvinyl acetate dispersions, ethyl vinyl alcohol dispersions, polyurethane dispersions, acrylic latexes, styrene butadiene dispersions, binders based on finely divided cellulose, binders based on cellulose derivatives, biopolymers, such as biopolymers based on starch derivatives, natural gum latexes, alginates, guar gum, hemicellulose derivatives, chitin, chitosan, pectin, agar, xanthan, amylose, amylopectin, alternan, gellan, mutan, dextran, pullulan, fructan, locust bean gum, carrageenan, glycogen, glycosaminoglycans, murein, bacterial capsular polysaccharides, and the like and combinations thereof.

One embodiment comprises using a binder which comprises a combination of
a first part of the binder being formed by a water soluble polymer or mixture of such polymers; and
a second part of the binder being formed by a water dispersible polymer or polymer mixture.

In one embodiment, the weight ratio between the first part (formed by the water soluble polymer or mixture of such polymers) and the second part (formed by a water dispersible polymer or polymer mixture) is 1:20-20:1, in particular 1:10 to 10:10, for example 1.5:10 to 2:20.

The binder comprising both a water soluble polymer and a water-dispersible polymer forms at least a part, preferably a majority, in particular 75 to 100%, advantageously 90 to 100% by weight of the total binder used for forming the fibrous layer of the water-dispersible sheet or web.

As referred to above, the water-dispersible composite structure comprises a network of fibers held together primarily by hydrogen bonds and adhesive bonding. However, there can be present also other components which modify the properties, in particular the chemical or physical, or both, of the network of fibers.

In one embodiment, the fibrous web or sheet further contains a sizing agent, in particular a reactive sizing agent. Examples of such agents are alkyl ketene dimer (conventionally referred to by the abbreviation "AKD") and alkenyl succinic anhydride ("ASA").

The sizing agent can be added separately. In one embodiment, however, the sizing agent is mixed with the binder(s).

The sizing agent can be added in amounts of 0.01 to 10%, in particular 0.1 to 5%, for example 0.15 to 3%, by dry weight of the fibrous layer.

In one embodiment, the method of producing a water-dispersible composite structure containing a layer comprising wood fibers, short-cut fibers and a binder or binder composition, comprises the steps of:
conveying an aqueous fibrous slush to a foraminous support, i.e. for example a conventional wire for wet forming; and
draining liquid through the foraminous support to form a fibrous layer; and
applying a binder on the fibrous layer for at least partially binding the fibers together.

Typically, in the present fibrous layers, the fibers form a fiber network by hydrogen bonds and/or adhesive bonding.

In one embodiment, the fibrous layer is, at an optional point of time, subjected to drying and optionally calendaring to form fibrous webs or sheets.

In one embodiment, the above method is carried out on a paper or paperboard machine or on a wet-laid non-woven machine.

Typically, the process is free from any hydroentanglement steps.

In one embodiment, the binder is applied on the fibrous layer as a foamed aqueous composition. Such a composition may comprise an aqueous solution of a water-soluble polymer further containing a dispersed water-dispersible polymer.

In one embodiment, the fibrous slush fed onto the wire or other foraminous support comprises man-made fibers or natural non-wood fibers or combinations thereof together with cellulosic fibers, lignocellulosic fibers or a mixture thereof. The consistency of the aqueous slush is, for example, 0.01 to 5% by weight, in particular 0.1 to 2% by weight.

In one embodiment, a binder composition is added in an amount of 0.1 to 20% by weight, for example 0.1-15% by weight, in particular 1.5 to 10% by weight of a binder, calculated based on the dry matter of the binder and the dry matter of the fibrous part of the fibrous layer.

In one embodiment, the binder is applied on the fibrous layer "at a predetermined stage". Thus, the binder can be applied onto the fibrous layer before it is dried to final dryness or only afterwards.

In one embodiment, the binder is applied on the fibrous layer having a moisture content of 90 to 10%.

In one embodiment, the binder is applied on the fibrous layer having a moisture content of about 85 to 65% by weight. In another embodiment, the binder is applied on the fibrous layer having a moisture content of about 2 to 10% by weight.

In one embodiment, the binder is applied onto the fibrous layer before pressing thereof. Such pressing is preferably carried out to effect water removal and before further drying and calendaring.

Irrespective of the application time, in one embodiment, the binder is applied onto the fibrous layer typically having a moisture content of less than about 10% by weight with a doctor blade, with an application roll. In another embodiment, the binder is applied onto the fibrous layer typically having a moisture content of 60% by weight or more by a vacuum-enhanced method, by a non-contact application or by combinations thereof.

The binder is applied onto at least one side, preferably on both opposite sides of the fibrous layer or, alternatively or in addition, using suction or reduced pressure ("vacuum").

As mentioned above, the "binder" may comprise one or several substances. It can be applied as an aqueous solution or as an aqueous dispersion or as a mixture thereof.

In one embodiment, the binder comprises an aqueous composition having a dry matter content of 1 to 50%, for example 1 to 30%, in particular 2.5 to 25% by weight and which contains at least one water soluble polymer and at least one water dispersible polymer.

In one embodiment, the binder contains at least one water soluble polymer and at least one water dispersible polymer at a weight ratio of 1:20-20:1, in particular 1:10-10:10. The weight ratio is calculated based on the dry weight of the polymers.

Of the binders listed above, particularly advantageous species are represented by polymers selected from the group of polyvinyl alcohols, polyvinyl acetate dispersions, ethyl vinyl alcohol dispersions, polyurethane dispersions, acrylic latexes, styrene butadiene dispersions, binders based on finely divided cellulose, binders based on cellulose derivatives, biopolymers, and combinations and mixtures of these.

Thus, in one embodiment, the binder is an aqueous composition obtained by dissolving a water soluble polymer in water to form an aqueous solution of said polymer, and subsequently dispersing a water dispersible polymer into the said aqueous solution.

The binder can for example comprise an aqueous composition prepared by the steps of first dissolving at least one water soluble polymer selected from the group of polyvinyl alcohol and polyvinyl acetate and combinations thereof, in water at a temperature of 10 to 100° C., in particular 15 to 100° C., at ambient pressure, to form a aqueous solution of the polymer, and then dispersing at least one polymer selected from the group of polyurethane dispersions, acrylic latexes, styrene butadiene dispersions, binders into the solution at a temperature of 20 to 100° C., at ambient pressure.

Preparation of the binder composition can be carried out in a mixer or disperser by subjecting the aqueous phase to intensive mixing and optionally to shear forces.

Preferably, the binder is provided as a stable dispersion.

In one embodiment, "stable dispersion" means that less than 20%, in particular less than 10%, suitably less than 5% of the weight of the dispersed solid matter settles out from the dispersion when standing for 24 hours at room temperature.

In one embodiment, the dispersion further contains a dispersing agent. Such an agent can be present in an amount of up to 5%, in particular up to 2.5% by weight of the solid matter of the dispersion.

In one embodiment, the binder composition obtained by dispersing a polymer which is dispersible in water into an aqueous solution of a water-soluble polymer, is then foamed before application onto the fibrous layer.

Depending on the actual binders used, a surfactant or foaming agent can be added to achieve foaming of the composition. The surfactant or foaming agent can be added in an amount of 0.01 to 15%, in particular 0.1 to 10% by weight of the dispersion. In one embodiment, the aqueous composition is however foamed in the absence of a surfactant.

In an embodiment, the foamed binder composition comprises 40 to 80% by volume, in particular 55 to 75% by volume of gas, in particular air.

The present water-dispersible composite structures typically comprise fibrous webs or sheets having a grammage of 10-250 g/m$^2$, in particular about 20-200 g/m$^2$. Such fibrous webs or sheets are preferably selected from the group of non-woven or paper webs and sheets.

A material according to the present technology has excellent properties. Thus, after preparation, the fibrous sheet or web exhibit good mechanical properties achieved partially by hydrogen bonding and partially by adhesive bonding between the fibers. No hydroentanglement or spunlacing is needed.

As mentioned above, compositions of the present kind are preferably capable of being disintegrated in a pulper, as conventionally used in the paper and paperboard industry.

Thus, in one embodiment, the fibrous web or sheet is capable of dispersing in an aqueous medium upon slushing. In an embodiment, the fiber web or sheet is capable of dispersing in an aqueous medium, such as water, at a temperature of 10 to 75° C. and a pH of 6 to 8, typically at a consistency of 1 to 40 wt-%, for example 2 to 35 wt-%.

As the examples discussed in the following will show, due to facile disintegration of the binder in the material during pulping, the fibers will be released and can be recovered and recycled.

The following non-limiting examples illustrate embodiments of the present technology.

Example 1

In the example, one embodiment of the post-consumer simulation of a fiber matrix bonded with a binder system of water soluble polymer, water dispersible polymer and hydrophobic agent according to the present technology was evaluated in pilot environment.

For the testing, 450 kg of fiber matrix bonded with a binder system was produced in a pilot wet forming process. The fiber matrix according to the present invention contained the following components:

Fiber Components:
Bleached softwood pine kraft pulp, unrefined: 60% by weight of the fiber matrix
Man-made fibers having a length of 6 mm and a thickness of 1.7 dtex: 30% by weight of the fiber matrix
Binder system:
Water dispersible polymer: 12% by weight of the binder system
Water soluble: 4% by weight of the binder system
Hydrophobic agent: 1.00% by weight of the binder system After production, the present material was repulped in an OptiSlush Bale pulper equipped with a JP rotor and a Ø mm screen plate. The repulping process conditions were the following:
Consistency: 7.45%
Temperature: 45° C.
Time: 20 min
pH: 6.9
Specific energy consumption: 59.4 kWh/tonne.

The amount of Somerville flakes (TAPPIT 275) was 35.3%, which is comparable with the amount of man-made fibers and water dispersible polymer. The trial showed that the binder system dissolves in conventional repulping systems and deliberates the pulp fibers. Further on, the pulp fibers can be separated from other components in coarse screening and reused again in new consumer products i.e. paper.

Example 2

In the example, one embodiment of the post-consumer simulation of a fiber matrix having the same components and component shares as in the Example 1 was compared with pure soft wood fiber suspension disintegrated from dried, unrefined soft wood pulp.

The produced fiber matrix and reference dried soft wood fiber sheet were disintegrated (40° C., 10 min, 3000 revolutions) in a British pulp disintegrator manufactured by Lorentzen & Wettre according to the PTS Method PTS-RH 021/97.

Figure 2:
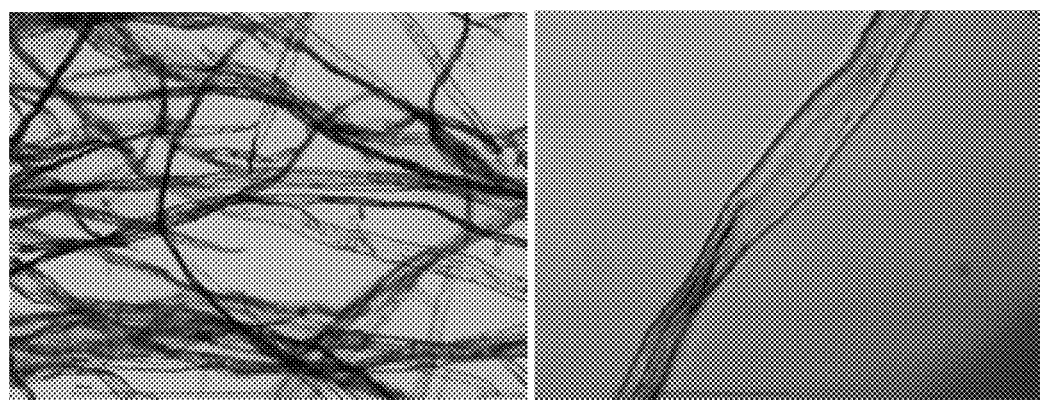
FIG. 2 is a micrograph showing on the left-hand side the accept of a material according to the present technology, and on the right-hand side the single fiber of such a material.

The disintegrated fiber matrix suspension and the reference soft wood fiber suspension were subjected to studies using light microscopy (Axioplan Carl Zeiss EL-Ensatz). The microscopy images show that the unscreened, disintegrated fiber matrix suspension's (FIG. 1) binder system has been already partly dissolved and the soft wood pulp fibers quality is equal to soft wood fibers (FIG. 2).

REFERENCE LIST

Patent Literature

U.S. Pat. No. 5,346,541
U.S. Pat. No. 3,563,241
U.S. Pat. No. 5,629,081
EP 1 285 985
US 2014/0318726

The invention claimed is:

1. A water-dispersible composite structure, comprising a fibrous layer, wherein:
   at least a part of the fibrous layer comprises a wet-laid fibrous web or wet-laid fibrous sheet comprising 50-90% by weight of wood fibers, 10 to 50% by weight of non-wood fibers, and 0.1-20% by weight of a binder, wherein the binder comprises at least one water-soluble polymer and at least one water-dispersible polymer at a weight ratio of 1:20-20:1, calculated based on the dry matter of the polymers.

2. The water-dispersible composite structure according to claim 1, wherein the wood fibers are selected from the group consisting of chemical pulp fibers, recycled fibers, mechanical pulp fibers, semi-mechanical pulp fibers, and combinations thereof.

3. The water-dispersible composite structure according to claim 1, wherein the non-wood fibers comprise natural or synthetic non-wood fibers selected from the group consisting of:
   annual or perennial plant fibers;
   thermoplastic fibers;
   bicomponent fibers comprising thermoplastic polymers;
   mineral fibers;
   glass fibers;
   regenerated cellulose fibers; and
   combinations of fibers selected from two or more of the aforementioned groups of fibers.

4. The water-dispersible composite structure according to claim 1, wherein the non-wood fibers comprise short-cut fibers having a length of 5 to 25 mm and a thickness of 0.5 dtex to 20 dtex.

5. The water-dispersible composite structure according to claim 1, wherein the non-wood fibers comprise man-made fibers selected from the group consisting of regenerated cellulosic fibers, synthetic fibers, synthetic thermoplastic fibers, and mixtures thereof.

6. The water-dispersible composite structure according to claim 1, wherein the non-wood fibers comprise regenerated cellulosic fibers selected from the group consisting of viscose fibers, lyocell fibers, rayon fibers, and mixtures thereof.

7. The water-dispersible composite structure according to claim 1, wherein the non-wood fibers comprise thermoplastic fibers selected from the group of polyolefin fibers, polyester fibers, biopolymer fibers, and mixtures thereof.

8. The water-dispersible composite structure according to claim 1, wherein the non-wood fibers comprise natural fibers derived from or selected from the group consisting of straws of grain crops, wheat straw, reed canary grass, reeds, flax, hemp, kenaf, jute, ramie, seed, sisal, abaca, coir, bamboo, bagasse, cotton kapok, milkweed, pineapple, cotton, rice, reed, esparto grass, *Phalaris arundinacea*, seed hair fibers, leaf fibers, bast fibers, and combinations thereof.

9. The water-dispersible composite structure according to claim 1, wherein the binder is selected from the group consisting of polyvinyl alcohols, polyvinyl acetate dispersions, ethyl vinyl alcohol dispersions, polyurethane dispersions, acrylic latexes, styrene butadiene dispersions, binders based on finely divided cellulose, binders based on cellulose derivatives, biopolymers, and combinations thereof.

10. The water-dispersible composite structure according to claim 1, wherein the wet-laid fibrous web or wet-laid fibrous sheet comprises a network of fibers held together primarily by hydrogen bonds or adhesive bonding.

11. The water-dispersible composite structure according to claim 1, wherein the wet-laid fibrous web or wet-laid fibrous sheet is capable of dispersing in an aqueous medium upon slushing.

12. The water-dispersible composite structure according to claim 1, wherein the wet-laid fibrous web or wet-laid fibrous sheet is capable of dispersing in an aqueous medium at a temperature of 10 to 75° C. and at a pH of 6 to 8.

13. The water-dispersible composite structure according to claim 1, wherein the wet-laid fibrous web or wet-laid fibrous sheet comprises a grammage of 10-250 g/m$^2$.

14. The water-dispersible composite structure according to claim 1, wherein the binder comprises the least one water-soluble polymer and the at least one water-dispersible polymer at a weight ratio of 1:10-10:1, calculated based on the dry matter of the polymers.

15. The water-dispersible composite structure according to claim 1, wherein at least 20 wt % of the fibers are capable of being recovered and recycled from the composite structure.

16. The water-dispersible composite structure according to claim 1, wherein the wet-laid fibrous web or wet-laid fibrous sheet comprises 0.01 to 10% by dry weight of a sizing agent.

17. The water-dispersible composite structure according to claim 16, wherein the sizing agent comprises a reactive sizing agent selected from the group consisting of alkyl ketene dimer, alkenyl succinic anhydride, and combinations thereof.

18. The water-dispersible composite structure according to claim 1,
   wherein binder comprises an aqueous dispersion of the at least one water-soluble polymer mixed with the at least one water-dispersible polymer,
   wherein the at least one water-soluble polymer is selected from the group consisting of polyvinyl alcohol, polyvinyl acetate, and combinations thereof, and
   wherein the at least one water-dispersible polymer is selected from the group consisting of a polyurethane dispersion, an acrylic latex, and a styrene butadiene dispersion, and combinations thereof.

19. The water-dispersible composite structure according to claim 1, wherein the binder comprises an aqueous composition having a dry matter content of from 1 to 50% by weight.

* * * * *